Feb. 27, 1934. G. BORNEMAN 1,948,560
FUNNEL GUIDE AND METHOD OF MAKING IT
Filed Nov. 30, 1929 2 Sheets-Sheet 1
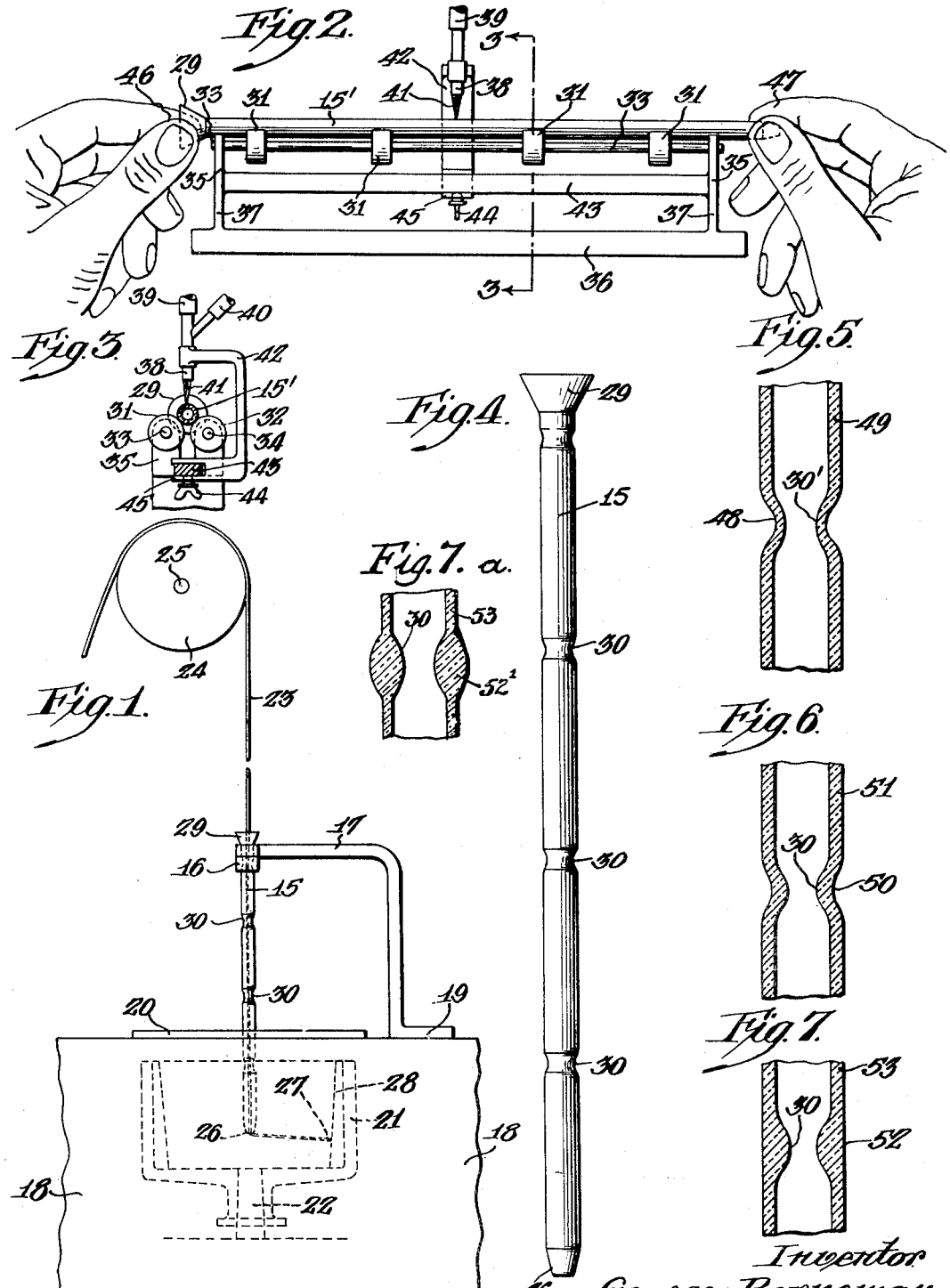
Inventor
George Borneman.
by
Attorney.
Witness:
Walter Ching.

Feb. 27, 1934.  G. BORNEMAN  1,948,560
FUNNEL GUIDE AND METHOD OF MAKING IT
Filed Nov. 30, 1929  2 Sheets-Sheet 2
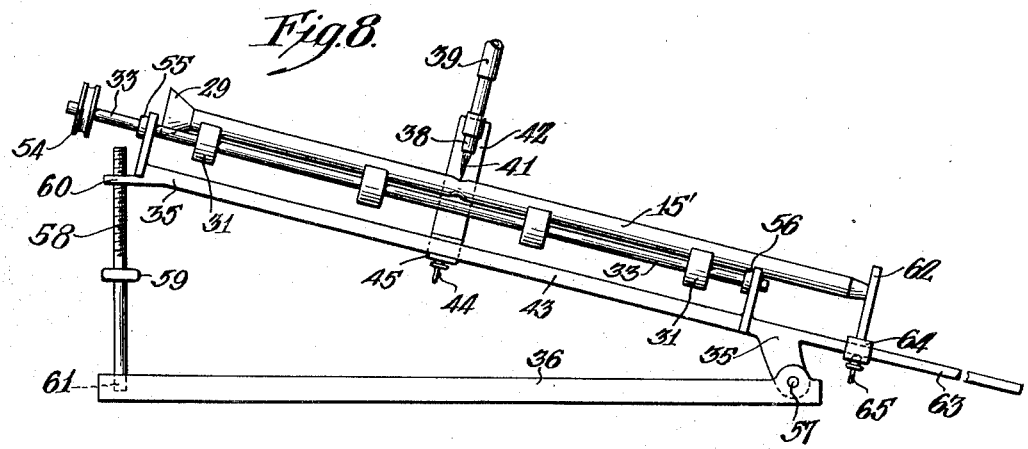
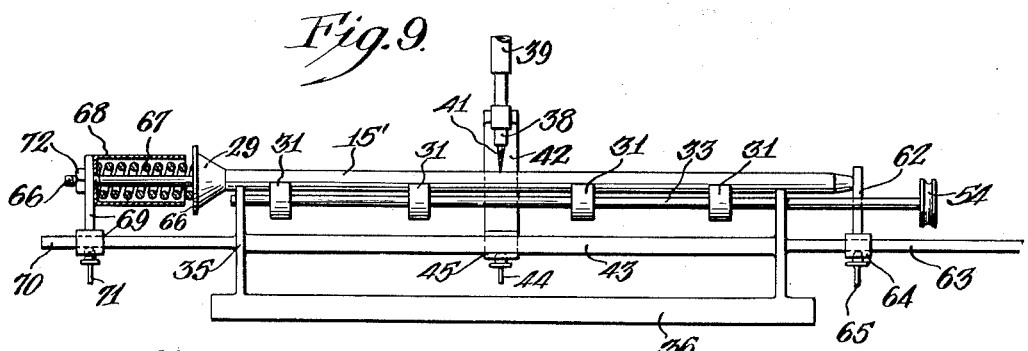
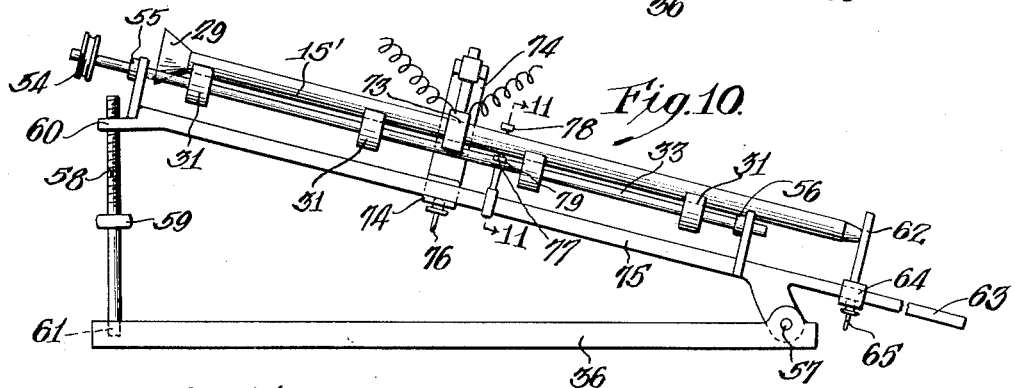
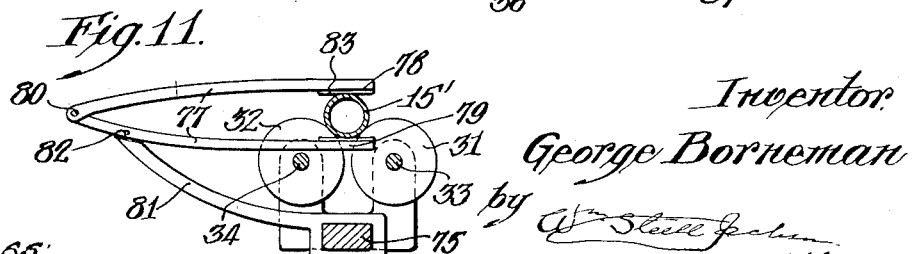
Inventor
George Borneman Patented Feb. 27, 1934

1,948,560

UNITED STATES PATENT OFFICE 1,948,560

FUNNEL GUIDE AND METHOD OF MAKING IT

George Borneman, Millville, N. J.

Application November 30, 1929
Serial No. 410,684

2 Claims. (Cl. 49—7)

My invention relates to constrictions in glass tubing, and particularly in "funnel tubes" for use as guides in the manufacture and handling of textile fibers, yarns and threads, especially rayon filament.

My invention relates chiefly to the methods involved and to the article which is secured by the use of these methods. It relates also, however, to the apparatus by which the methods may be carried out.

The principal purpose of my invention is to increase the strength and resistance to mechanical shock from handling of funnel tubes.

A further purpose of my invention is to make unnecessary the use of special care while removing funnel tubes from their holders.

A further purpose is to provide funnel tubes whose shearing strengths shall be substantially uniform throughout their lengths.

A further purpose is to transversely strengthen glass tubing after the fashion of bamboo.

A further purpose is to manufacture funnel tubes of greater uniformity of shape than has been possible heretofore.

A further purpose is to reduce the distortion produced in the inside of the constriction wall during manufacture.

A further purpose is to manufacture funnel tubes by a method susceptible to automatic use in quantity production.

A further purpose is to permit the manufacture of funnel tubes by a machine which can be operated by a person unskilled in the manipulation of glass.

A further purpose is to manufacture a constriction in glass tubing without weakening the same.

A further purpose is to concurrently constrict and strengthen what would otherwise be a weakened structure.

Further purposes will appear in the specification and in the claims.

I have preferred to illustrate my method and the apparatus for carrying it out by four forms only, selecting those which are practical, efficient, economical and inexpensive, but which at the same time well illustrate the principles of my invention.

Figure 1 is a side elevation showing the funnel tube and spinning bucket as commonly employed in the production of a coil or "cake" of rayon by the viscose process.

Figure 2 is a side elevation of my invention employed in producing a funnel tube by hand working.

Figure 3 is a fragmentary section of Figure 2 along the line 3—3.

Figure 4 is a side elevation of the completed funnel tube made in accordance with my invention.

Figure 5 is a constriction found in the prior art, and seen in fragmentary detail axial section.

Figure 6 is a fragmentary detail axial section of a tube constricted according to my method.

Figure 7 shows in fragmentary detail axial section a slightly different construction produced by my invention.

Fig. 7a corresponds to Figure 7, but shows the tube externally enlarged at the constriction.

Figure 8 shows in side elevation a machine for producing constrictions by my method.

Figure 9 is a side elevation of another embodiment of my invention applied to machine working.

Figure 10 shows in side elevation another apparatus for applying my invention.

Figure 11 is a section along the line 11—11 of Figure 10.

In the drawings similar numerals indicate like parts.

Figure 1 shows the finished glass funnel tube 15, inserted through rubber holder 16, and mounted in bracket 17, which is attached to safety shield 18 at 19. The funnel tube 15 extends through an opening in safety cover 20 to a point near the middle of spinning bucket 21. The spinning bucket is rapidly rotated upon mount 22.

The structure as shown in Figure 1 is substantially that used in winding the spoolless coil or "cake" of rayon filament in the viscose process. The rayon filament 23, coming from Godet wheel 24, on shaft 25, is led through the inside of the funnel tube 15. At the lower end 26 of the funnel tube the filament is fed radially to the winding surface 27 on the inside of the partially wound "cake" 28.

The funnel tube performs a guiding function as seen in Figure 1. The interiors of similar glass tubes are used as guides in the manufacture and handling of thread, yarn, textile fiber and filament generally.

In this guiding function the funnel tube of the prior art comprises a glass tube having an upper guiding entrance funnel opening 29 from which it gets its name, and a series of constrictions at intervals, at the lower end of the funnel and throughout the length of the tube, as seen at 30 in Figure 1. The constrictions are provided in order to maintain the filament near the axis of the tube, to prevent the filament from dragging against the tube walls, and to avoid imparting lateral oscillation to the travelling filament. The inner diameter of the constriction must be less than the inner diameter of the glass tube, but somewhat greater than the filament diameter.

Such constrictions have been previously manufactured by elongating the tube after it has been softened by the application of heat at one point, or by attaching a clamp or die about the circumference of the glass tubing at the point of softening. It is also old to form external bulbs in glass tubing or rod by locally heating the rotating tubing or rod and applying pressure to the end.

Both of the old methods of constricting the glass have stretched and thinned the tubing walls at the point of constriction and have weakened the tubing against both shock and lateral or angular breaking strains. As a result, the tubes have been subject to frequent breakage at the points of constriction.

When used in connection with the rayon filament as shown in Figure 1, it is necessary to remove the funnel tube whenever it is desired to lift out the "cake". The workmen quite frequently strike the funnel tube against surrounding objects during this operation, or drop it upon the floor, and in almost every case where this occurs, the tube is broken in the neighborhood of one of the constrictions.

With a view to reducing this loss by breakage, I have originated a new process for the manufacture of constrictions, having as its purpose the production of a constriction, the wall of which will be ordinarily of greater thickness than the wall of the original tube. My invention is directed mainly to improving the method of tube constriction to secure an improved thickened reinforced tube constriction.

Broadly my invention comprises feeding softened glass longitudinally to supply additional glass for the constriction, and concurrently forcing the glass inwardly to distribute the additional glass in the form of a reinforcement and at the same time to reduce the internal diameter to that desirable at the constriction.

I use glass tubing of any desired bore cut to a suitable length, and either with or without the funnel attached to the end. Both ends of the glass tubing may be desirably left open during my entire operation.

In operation heat softens the glass. At the same time gentle endwise pressure upon the tube tends to shorten the length of the tube, whether this endwise pressure be secured by gravity through sloping the tube or by pressure lengthwise of the tube.

In my preferred form, concurrently with the feeding pressure, the impact of the hot products of combustion tends to contract the softened glass inwardly and the centrifugal force due to the necessary rotation tends to expand the glass outwardly. My invention is based upon an adjustment of these such that no objectionable outward expansion shall take place. Whether there be trivial expansion or not is immaterial, as in any event I secure a thickening of the glass inwardly, which is highly desirable for strengthening purposes and which at the same time gives the guiding glass constriction previously secured by clamping means.

In Figure 2 I apply my method to hand working. While the method could be carried out with the aid of a flame alone, I prefer to use further apparatus as shown, in order to get greater uniformity, which is always lacking in any hand operation.

The glass blank 15', with or without the funnel 29 attached, is placed upon a plurality of sets of rollers 31 and 32, mounted rigidly upon shafts 33 and 34, in the carriage 35. The carriage 35 is rigidly connected to base 36 by supporting strips 37.

The device is provided with a gas burner 38, supplied with air and gas through the hose lines 39 and 40, and projecting the jet 41 against the tube 15'.

The burner pipe 38 is mounted upon the collar and bracket member 42, which is free to slide along the guide rod 43, and may be clamped in any desired position by the set-screw 44 in the collar portion 45.

The fingers of the operator are represented by 46 and 47. He must rotate the glass slowly in order to prevent cracking from uneven heating. The rate of work rotation must not be too great, as centrifugal force will tend to produce a bulb in the glass rather than a constriction. For small tubing a speed of about 200 R. P. M. has been found quite satisfactory.

For heating I prefer to use a small pin fire or cross fire gas flame impinging upon the tube at or near its top. When heated near the top the softened glass will normally sag inwardly due to the effect of gravity and the pressure of the jet. As the tube is rotated this sagging will produce a constriction.

I find that satisfactory results may be produced by placing the flame at the side or bottom of the tube also. This will operate properly because the jet pressure is sufficient to force the softened glass inwardly toward the axis of the glass tubing, and the speed of rotation is so low that the centrifugal force is not great enough to press the glass outwardly to form a bulb.

When the glass is softened the operator must continue rotation and gradually press the tube on both sides of the point of softening toward the point of softening. By so doing additional glass is made available at the point of softening to produce a constriction having walls thicker than ordinary. At the same time the glass is forced inwardly by jet pressure, so that the internal diameter decreases and additional glass takes its place in the wall at the constriction.

After the desired number of constrictions have been produced in the blank, the completed funnel tube will appear as shown in Figure 4.

In the manufacture of funnel tubes according to my invention it is most important that longitudinal pressure be applied to the glass tubing in the direction of its major axis. When glass tubing is constricted without permitting any longitudinal movement of the tubing on either side of the point of softening toward the point of softening, the surface of the tubing is increased, because the glass is stretched out to form a concave surface instead of a shorter cylindrical surface between the same points, and therefore the thickness of the tubing at the constriction is decreased.

Figure 5 shows a constriction 30' as made in the prior art. The wall thickness at the point of constriction 48 is much less than that at some remote point 49, so that the tube is very weak.

By providing for longitudinal movement of the glass tubing on either or both sides of the point of softening of the glass toward the point of softening, I supply additional glass at the point of softening, thus compensating for the tendency toward decreased wall thickness at the constriction, and, if desired, permitting production of a wall thicker at that point than elsewhere.

Figures 6, 7 and 7ᵃ show variant forms of constrictions 30 manufactured according to my method. In Figure 6 the wall of the constriction at 50 is of a thickness slightly greater than that of the tube elsewhere, as at 51. In Figure 7 the thickness of the glass at 52, in and about the point of constriction, is considerably greater than that at some remote point, at 53, so that the tube is of substantially uniform external diameter throughout its length. In Figure 7ᵃ the external diameter of the two is increased slightly at 52' with respect to the normal external diameter, as indicated, for example, at a point 53.

In addition to use in hand operation, I find that my method may be even more desirably applied by means of a machine. A machine offers the distinct advantage of greater uniformity.

In the machine shown in Figure 8 the glass blank 15' is placed on the rollers 31 and 32 as before, and rollers 31 are capable of being rotated by the application of power, not shown, to shaft 33 through pulley 54, in order to maintain the blank 15' in rotation about its major axis. Shafts 33 and 34 are maintained in position by upper collars 55 and lower collars 56.

Shafts 33 and 34 and the carriage 35 upon which they are mounted are inclined to the horizontal. In my illustration I have greatly exaggerated the inclination. The angle of inclination of the carriage with respect to the base 36, to which it is pivoted at 57, may be changed to suit the particular need of the operator by turning adjusting screw 58 by knurled wheel 59. Screw 58 passes through the threaded hole 60 in carriage 35, and seats in a socket 61 in base 36.

The glass tubing is prevented from slipping longitudinally downward during rotation by the stop 62, which is adjustably supported from the guide rod 63, by the collar 64, rigid with the stop 62, and provided with the set-screw 65. Guide rod 63 is mounted on carriage 35.

The gas burner and support are identical in structure and function with those shown in Figures 2 and 3.

For the sake of simplicity, I prefer to apply longitudinal pressure by inclining the funnel tube as shown in Figure 8, so that the portion of the glass tubing above the point of softening of the glass may slide toward the point of softening under the action of gravity. This embodiment of my invention offers the distinct advantage over other possible forms that the amount of longitudinal pressure may be regulated over a wide range by adjusting the angle of inclination of the funnel tube.

It is thoroughly feasible, however, and may be preferable for the manufacture of tubes of a highly standardized design, to apply pressure to one or both ends of the funnel tube, according to the general plan of Figure 9.

In Figure 9 the carriage 35 is rigid with the base 36, and supports the shafts 33 and 34 in a permanent position, which may be desirably horizontal. The rollers 31 are driven by the pulley 54. Pressure is applied to the end of the blank 15' by the plunger 66, impelled by the spring 67, against the stop 62, which is constructed as shown in Figure 8. Plunger 66 and spring 67 are mounted in the sleeve 68 fastened to the collar and bracket member 69.

Member 69 is free to move along the guide rod 70 supported from carriage 35, to any desired position, and then may be held thereby tightening the set-screw 71 in collar 69. The tension of spring 67 may be changed by adjustment nut 72. The gas burner is the same as that seen in Figure 8.

Figure 10 is generally similar to Figure 8, and the differences therefrom will alone be described.

Heating is accomplished by using an annular electric heating coil 73, supported by the collar and bracket 74, and capable of being positioned at any point along the guide rod 75 by the set-screw 76. When the glass has been heated to the point of softening, the heating coil 73 may be moved along the guide rod 75 so as not to interfere with further operations. The clamp 77, freely sliding on the guide rod 75, may then be moved to the place of softening of the glass, and closed by hand upon the glass by pressing together the jaws 78 and 79, pivoted at 80, the glass tubing being rotated while the clamp is closed to produce a symmetrical constriction. Bracket and collar member 81 pivotally supports the clamp 77 at 82.

I have shown a flat surfaced clamp used with rotating tubing, but any other desired shape of clamp might be used, with or without rotation, depending upon its shape.

I may employ the annular electric heating coil and clamp as shown in Figures 10 and 11 on the apparatus as shown in Figure 9, instead of the flame there shown.

The electric resistance heating coil and clamp act in essentially the same manner as the flame jet. The resistance coil supplies heat just as does the gas flame, and the ribs 83 on the clamp press in the softened glass just as does the jet pressure. After the glass has been heated to the point of softening by any suitable means, the constriction is formed by circumferential pressure from the die or clamp, and glass is simultaneously supplied to meet the deficiency at the point of constriction by longitudinal movement of the tubing on either or both sides of the point of softening toward the point of softening.

Some rotation of the tube is of course necessary in the form of my invention shown in Figures 8 and 9, so that the glass may be heated about its circumference with sufficient uniformity to prevent all possibility of cracking. I prefer to use "back patent" rollers. The inclination or longitudinal pressure prevent the glass from "pulling" when heated.

I may use any suitable method of heating. I consider the method of heating shown in Figure 10 inferior to the gas jet shown in my other forms. When the heating coil is used, it is not essential to rotate the tube to produce uniformity in heating, but I still prefer to have some rotation so that the tube will not sag, and in the form of Figure 10 to insure that the glass will feed uniformly toward the point of softening, and also to produce a symmetrical constriction when the clamp is applied.

In the forms shown in Figures 8 and 10, the extent of constriction and the thickness of the glass at the point of constriction depend upon the quality of the glass used, the rapidity of heating, the time during which the tube is exposed to the heat, and the angle of inclination of the tube. Since the angle of inclination of the tube is readily adjustable, I ordinarily change this angle to suit different styles of work, and then vary the time if further adjustment is required. In the form shown in Figure 9, I increase or decrease the pressure of the plunger spring according to the style of work which I intend to do.

For producing tubes on a small scale, I find it quite satisfactory to move the position of the flame or other heating means with respect to the tube by releasing the set-screw and sliding the collar along the guide to the next point at which a constriction is desired, or else, to allow the flame to remain stationary and to move the tube as desired, after releasing the set-screw holding the stop. However, my invention might be applied in the form of a plurality of units along the length of the tube, although I do not recommend this, since it would be inconvenient.

When I have completed the manufacture of the desired number of constrictions in a tube, I place it in a suitable annealing furnace, or expose it to a soft fire, to eliminate possible strains produced in the glass. It is quite desirable to mount a soft fire under the tube at the point where the constriction is to be produced, and to simply move the pin fire when the tube has been sufficiently constricted and anneal the constriction without removing the tube from the rollers.

By using my invention it is possible to increase the external diameter of the tube at the point of constriction until it is greater than the external diameter of the tube elsewhere. This I do not find advantageous because the funnel tube while in use must fit rather closely into a holder, and any deformity of the tube tending to increase its external diameter would be objectionable. Should it be at any time desirable to employ constricted tubes of external diameters increased at the point of constriction, I can, of course, manufacture such tubes in accordance with my invention. For this purpose I find it desirable to increase the speed of rotation of the glass tubing, so that centrifugal force will tend to make the hot glass increase the outer diameter of the constriction.

In the present art it is not generally undesirable that funnel tubes should have slightly smaller external diameters at the points of constriction than elsewhere. Therefore, except for the sake of appearance, I do not consider it necessary to increase the thickness of the walls of the tube at the point of constriction to such an extent that the external diameter at that point will be the same as the external diameter of the tube previous to constriction. I find it entirely possible, however, to manufacture tubes by my invention which have a uniform external diameter throughout their lengths.

If it should be desired to produce constrictions in any other types of glass tubing besides funnel tubes, or for any other purposes, my invention is equally applicable to this work, and I claim any such uses or tube structures.

Since my constrictions of abnormal wall thickness greatly increase the strength of the glass tubing against lateral stresses, I propose to use tubing thus strengthened wherever the usefulness of glass tubing has been limited because of its excessive fragility, and such constrictions will not interfere with the purpose. I also propose to use my reinforced tubing to replace glass rods.

By applying my constrictions to vials and bottles I can greatly decrease their fragility.

In view of my invention and disclosure, variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of concurrently constricting a glass tube intermediate its ends and strengthening it at the point of constriction which consists in inclining the tube at an angle above the horizontal and below the vertical, in rotating the tube, in locally heating the tube and in supporting the tube on both sides of the point of heating, whereby glass is supplied to the point of heating by longitudinal movement of the part of the tube above the point of heating and the tube is concurrently constricted.

2. In a device for constricting glass tubing, means for locally heating the glass tubing, a support maintaining the glass tubing at an angle inclined to the horizontal, such that, as the glass softens, the portion of the glass tubing above the point of softening is free to move longitudinally toward the point of softening, and mechanical pressure apparatus for circumferentially distributing the glass wall inwardly at the point of softening.

GEORGE BORNEMAN.